(12) United States Patent
Funamoto

(10) Patent No.: US 9,347,831 B2
(45) Date of Patent: May 24, 2016

(54) ELECTRONIC APPARATUS AND CONTROL METHOD OF ELECTRONIC APPARATUS

(71) Applicant: Seiko Epson Corporation, Tokyo (JP)

(72) Inventor: Tatsuaki Funamoto, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/630,029

(22) Filed: Feb. 24, 2015

(65) Prior Publication Data

US 2015/0241279 A1 Aug. 27, 2015

(30) Foreign Application Priority Data

Feb. 26, 2014 (JP) ................................ 2014-035043

(51) Int. Cl.
*G01N 21/25* (2006.01)
*G01J 3/28* (2006.01)
*G01J 3/12* (2006.01)

(52) U.S. Cl.
CPC ................. *G01J 3/2823* (2013.01); *G01J 3/12* (2013.01); *G01J 2003/1213* (2013.01); *G01J 2003/2826* (2013.01)

(58) Field of Classification Search
CPC ................. G01J 3/28; G01J 3/02; G01J 3/26; G01J 3/51; G01J 3/2823; G01N 21/255
USPC ................................................. 356/402–425
See application file for complete search history.

(56) References Cited

U.S. PATENT DOCUMENTS

| 2009/0027518 | A1  | 1/2009 | Kita |
| 2010/0158330 | A1* | 6/2010 | Guissin .............. G06K 9/00369 382/128 |

FOREIGN PATENT DOCUMENTS

| JP | 2009-033222 A | 2/2009 |
| JP | 2009-071676 A | 4/2009 |
| JP | 2009-118359 A | 5/2009 |
| JP | 2009-141842 A | 6/2009 |

* cited by examiner

*Primary Examiner* — Abdullahi Nur
(74) *Attorney, Agent, or Firm* — Harness, Dickey & Pierce, P.L.C.

(57) ABSTRACT

A spectrometry device includes a wavelength variable interference filter, a filter driving unit, an imaging element which obtains color images corresponding to light with a red wavelength, light with a green wavelength, and light with a blue wavelength, respectively, and a composition unit which generates a composite image in which the red image, the green image, and the blue image are composited, the filter driving unit causes the wavelength variable filter to change the red wavelength every time when the red image is obtained, causes the wavelength variable filter to change the green wavelength every time when the green image is obtained, and causes the wavelength variable filter to change the blue wavelength every time when the blue image is obtained.

7 Claims, 7 Drawing Sheets

ELECTRONIC APPARATUS AND CONTROL METHOD OF ELECTRONIC APPARATUS

BACKGROUND

1. Technical Field

The present invention relates to an electronic apparatus, and a control method of the electronic apparatus.

2. Related Art

In the related art, an apparatus which obtains a spectroscopic image with respect to light with a predetermined wavelength by causing an imaging element to receive light which has passed through a spectral filter is known (for example, refer to JP-A-2009-118359).

The apparatus which is described in JPA-2009-118359 is configured so as to obtain a spectroscopic image which is a captured image of an imaging target with respect to a plurality of wavelengths, and to perform a preview display of a color image which is obtained by compositing the spectroscopic images.

Here, in the electronic apparatus which is described in JP-A-2009-118359 in which spectrometry is performed by obtaining a spectroscopic image, there is a case in which a relative position of the electronic apparatus and an imaging target is determined, or a position of performing an analysis process is specified with reference to a preview display of the above-described color image.

However, since a color image is generated after obtaining a spectroscopic image with respect to a plurality of wavelengths in the apparatus which is described in JP-A-2009-118359, it is not possible to generate a new color image while the spectroscopic image is obtained. For this reason, it is not possible to update a preview display until the obtaining process of the spectroscopic image is completed, and updating of the preview display is delayed.

That is, in the apparatus which is described in JP-A-2009-118359, it is not possible to update the preview display while the spectrometry is performed, it is not possible to perform a real time display in which a color image (real time image) is displayed in real time using the obtained spectroscopic image.

SUMMARY

An advantage of some aspects of the invention is to provide an electronic apparatus which is capable of performing a real time display while performing spectrometry, and a control method of the electronic apparatus.

According to an aspect of the invention, there is provided an electronic apparatus which includes a spectral filter which selectively outputs light with a predetermined wavelength from input light, and is capable of changing the wavelength of the output light; a filter driving unit which sequentially outputs light with a predetermined red wavelength which is included in a red wavelength range, light with a predetermined green wavelength which is included in a green wavelength range, and light with a predetermined blue wavelength which is included in a blue wavelength range from the spectral filter by controlling the spectral filter; an imaging element which receives the light output from the spectral filter, and obtains a red image corresponding to the light with the red wavelength, a green image corresponding to the light with the green wavelength, and a blue image corresponding to the light with the blue wavelength; and a composition unit which generates a composite image in which the red image, the green image, and the blue image are composited, in which the filter driving unit changes the red wavelength in the red wavelength range every time the red image is obtained using the imaging element, changes the green wavelength in the green wavelength range every time the green image is obtained using the imaging element, and changes the blue wavelength in the blue wavelength range every time the blue image is obtained using the imaging element.

In the aspect of the invention, light with a red wavelength corresponding to a red image, light with a green wavelength corresponding to a green image, and light with a blue wavelength corresponding to a blue image are sequentially output from the spectral filter in order to obtain a red image, a green image, and a blue image which are necessary for compositing a real time image. At this time, when a red image is obtained, a wavelength setting unit changes a red wavelength when obtaining the subsequent red image. Similarly, when a green image is obtained, the wavelength setting unit changes a green wavelength when obtaining the subsequent green image, and when a blue image is obtained, the wavelength setting unit changes a blue wavelength when obtaining the subsequent blue image.

With such a configuration, red light in the red wavelength range, green light in the green wavelength range, and blue light in the blue wavelength range are sequentially output from the spectral filter, and three color images which are spectroscopic images corresponding to each color light, respectively, are sequentially obtained. Accordingly, by compositing the latest red image, green image, and blue image, a highly accurate real time image is displayed, that is, it is possible to perform a real time display.

In addition, a wavelength which is output from the spectral filter in each wavelength range is changed every time each color image is obtained. For example, a red wavelength is changed every time a red image is obtained. In this manner, when a wavelength which is output from the spectral filter is changed in each color wavelength range, and light intensities with respect to the plurality of wavelengths are obtained, it is possible to perform highly accurate spectrometry based on the obtained light intensities.

As described above, in the aspect of the invention, it is possible to generate a composite image using the obtained three color images while obtaining color images corresponding to a plurality of wavelengths which are necessary for spectrometry, and to perform a real time display and spectrometry at the same time.

In the electronic apparatus, it is preferable that the filter driving unit change the red wavelength, the green wavelength, and the blue wavelength using an amount of change in wavelength in a predetermined threshold value.

In the aspect of the invention, when a wavelength of output light is changed in each wavelength range, the wavelength is set so that the changing amount is in a predetermined threshold value.

For example, when wavelengths of 500 nm, 520 nm, 540 nm, 560 nm, and 580 nm are set with respect to a green wavelength range, there is a difference of 80 nm between 500 nm which is a wavelength close to the blue wavelengths and 580 nm which is a wavelength close to the red wavelengths. Accordingly, when a composite image which is generated using a blue image of 580 nm is displayed after display of a composite image which is generated using a blue image of 500 nm, there is a concern that hue may suddenly fluctuate when updating a real time image. When an amount of change in wavelength between color images which are sequentially obtained exceeds a predetermined threshold value in the same wavelength range, even when images of the same imaging target are captured, there is a case in which a grayscale value in each of color images which is generated using each of color images consecutively obtained is remarkably changed. In this case, hue of a displayed real time image may be changed every time a real time display is updated.

In contrast to this, in the aspect of the invention, it is possible to suppress a change in hue of a real time image since a wavelength of output light is changed using an amount of change within the predetermined threshold value.

In the electronic apparatus, it is preferable that the filter driving unit sequentially change a wavelength of light which is output from the spectral filter from a maximum wavelength to a minimum wavelength, after sequentially changing the wavelength of the light from the minimum wavelength which is preset to the maximum wavelength which is preset with respect to each wavelength range of the red wavelength range, the green wavelength range, and the blue wavelength range.

In the aspect of the invention, when a wavelength of output light is sequentially changed, the wavelength is sequentially changed from a minimum wavelength to a maximum wavelength which are set in each wavelength range, and the wavelength is sequentially changed from the maximum wavelength to the minimum wavelength thereafter.

For example, as described above, when the wavelength in the green wavelength range (500 nm to 580 nm) is changed from the maximum wavelength (580 nm) to the minimum wavelength (500 nm), a wavelength of the green image fluctuates by 80 nm, and accordingly, there is a concern that hue may suddenly fluctuate when updating a real time image.

In contrast to this, in the aspect of the invention, the green wavelength is changed at intervals of 20 nm, for example, toward the minimum wavelength (500 nm) again, when reaching the maximum wavelength (580 nm). With such a configuration, it is possible to suppress an amount of change in wavelength, and to suppress a change in hue of a real time image, since the amount of change in wavelength becomes approximately constant.

In the electronic apparatus, it is preferable to include a correction unit in which a grayscale value of at least one of the plurality of composite images obtained by capturing images of the same imaging target is corrected, and a difference in grayscale value between the plurality of composite images is set so as to be within a range of a predetermined second threshold value.

In addition, the correction of a grayscale value of a composite image is not limited to a correction of a grayscale value of a generated composite image, and also includes a correction of a grayscale value of a composite image by correcting grayscale values of three color images which are generation sources of the composite image.

Here, the composite image is generated by changing a wavelength of output light in each wavelength range every time a color image is obtained, and by compositing each of the latest color images. In this manner, when a wavelength of output light in each wavelength range is changed, even when images of the same target are captured, a difference in grayscale value exceeds the second threshold value between a plurality of composite images, and there is a concern that hue may fluctuate between the plurality of composite images.

In contrast to this, in the aspect of the invention, the correction unit corrects a grayscale value of at least one composite image among the plurality of composite images which are obtained by capturing images of the same imaging target, and sets a difference in grayscale value between the plurality of composite images to be within the predetermined second threshold value. For example, when these plurality of composite images are obtained by capturing images of the same target, a grayscale value of another composite image is corrected so that a difference between a grayscale value of one reference image among the plurality of composite images and a grayscale value of another composite image is in the range of the second threshold value. In addition, for example, even when a red wavelength in the red wavelength range is changed between 600 nm to 680 nm, a grayscale value of the red image is corrected based on a grayscale value of representative wavelength (for example, center wavelength of 640 nm). The same is applied to the green image and the blue image.

In such a configuration, a difference in grayscale value between a plurality of composite images is set so as to be within the predetermined second threshold value. In this manner, it is possible to suppress a change in grayscale value which occurs due to a fluctuation of a wavelength in each color wavelength range, and to suppress a change in hue of a real time image between a plurality of composite images.

In the electronic apparatus, it is preferable to further include a storage unit which stores each wavelength which is set using the filter driving unit, and an image which is captured using the imaging element with respect to each of the wavelengths; and an analysis processing unit which performs spectrometry on an imaging target using an image with respect to each wavelength.

In the aspect of the invention, an image corresponding to each of set wavelengths is stored, and an analysis process such as color analysis using the stored image with respect to each wavelength is performed.

In such a configuration, the color image is stored by being correlated with a wavelength every time a color image for performing a real time display is obtained.

For this reason, it is possible to store a spectroscopic image corresponding to a wavelength which is necessary for an analysis process in advance at a point of time in which a user determines performing of the analysis process with reference to a real time display. Accordingly, it is possible to shorten a time which is necessary for the spectrometry.

In the electronic apparatus, it is preferable to further include a detection unit which detects a change in imaging target between the color images corresponding to the same wavelength range among each color image of the red image, the green image, and the blue image which are stored in the storage unit.

In the aspect of the invention, a change of an imaging target is detected between color images corresponding to the same wavelength range, among color images which are stored in the storage unit.

Here, when an analysis process is performed using color images of which imaging targets are different at the same time, it is not possible to perform an accurate analysis process, and accuracy of analysis deteriorates.

In the aspect of the invention, for example, it is possible to obtain a color image before performing an analysis process by detecting a change of an imaging target. Accordingly, it is possible to prevent performing of a spectrometry process using a wrong color image as described above, and to prevent deterioration in analysis accuracy.

According to another aspect of the invention, there is provided a control method of an electronic apparatus which includes a spectral filter which selectively outputs light with a predetermined wavelength from input light, and is capable of changing the wavelength of the output light; a filter driving unit which outputs light with a predetermined wavelength from the spectral filter by controlling the spectral filter; an imaging element which obtains a color image by receiving color light which is output from the spectral filter; and an image generation unit which generates a composite image using the color image which is obtained using the imaging element, the method including obtaining a red image corresponding to light with a red wavelength, a green image corresponding to light with a green wavelength, and a blue image corresponding to light with a blue wavelength using the imaging element, by sequentially outputting light with a predetermined red wavelength which is included in a red wavelength range, light with a predetermined green wavelength which is included in a green wavelength range, and light with a predetermined blue wavelength which is included in a blue wavelength range from the spectral filter; changing the red wavelength in the red wavelength range every time the red image is obtained; changing the green wavelength in the green wavelength range every time the green image is obtained; changing the blue wavelength in the blue wavelength range every time the blue image is obtained; and generating a composite image in which the obtained red image, green image, and blue image are composited.

In the control method of the electronic apparatus, similarly to the above described invention, red light in a red wavelength range, green light in a green wavelength range, and blue light in a blue wavelength range are sequentially output from the spectral filter, and each of three color images which is a spectroscopic image corresponding to each color light, respectively, is sequentially obtained. In addition, a composite image is generated by compositing the obtained three color images.

Accordingly, similarly to the above described invention, it is possible to perform a real time display and spectrometry with high accuracy. In addition, it is possible to generate a composite image using the obtained three color images while obtaining color images corresponding to a plurality of wavelengths which are necessary for spectrometry, and to perform the real time display and the spectrometry at the same time.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described based on drawings.

Configuration of Spectrometry Device

Figure 1:
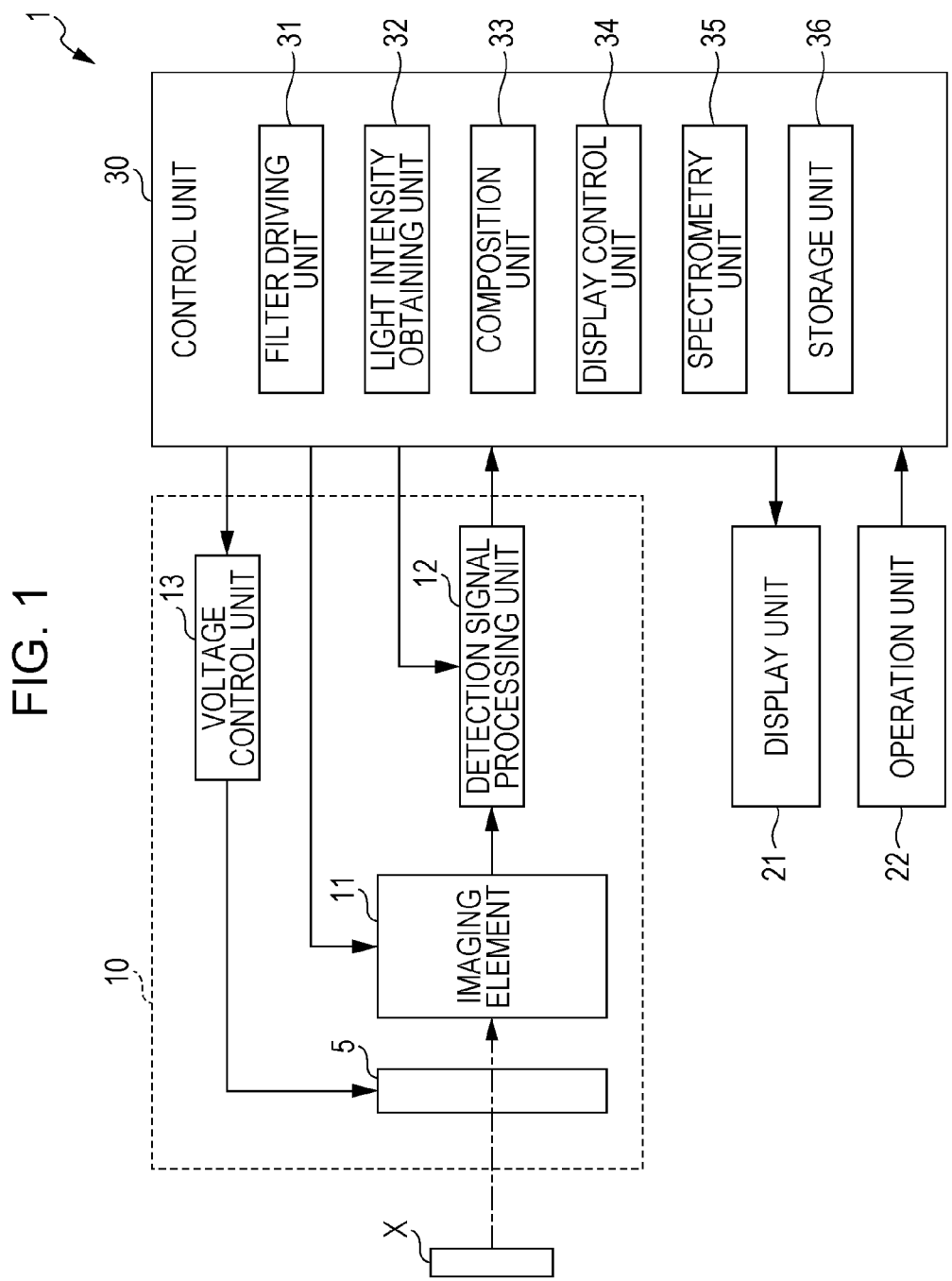
FIG. 1 is a block diagram which illustrates a schematic configuration of a spectrometry device according to a first embodiment of the invention.

FIG. 1 is a block diagram which illustrates a schematic configuration of a spectrometry device according to a first embodiment of the invention.

A spectrometry device 1 corresponds to an electronic apparatus of the invention, and is a device which analyzes a light intensity of each wavelength in measurement target light which is reflected from a measurement target X, and measures spectral spectrum. As illustrated in FIG. 1, the spectrometry device 1 includes an optical module 10, a display unit 21, an operation unit 22, and a control unit 30 which controls the optical module 10 and the display unit 21, and processes a signal which is output from the optical module 10.

In the spectrometry device 1, a measurement position in the measurement target X is set by determining a relative position of the spectrometry device 1 and the measurement target X when performing spectrometry on the measurement target X. At this time, an image which is captured using the optical module 10 is displayed on the display unit 21 in real time, and the relative position of the spectrometry device 1 and the measurement target X is determined with reference to the image (hereinafter, also referred to as real time image).

In addition, according to the embodiment, an example in which measurement target light which is reflected from the measurement target X is measured is described; however, when a luminous body such as a liquid crystal panel, for example, is used, light which is emitted from the luminous body may be set to a measurement target as the measurement target X.

Configuration of Optical Module

The optical module 10 includes a wavelength variable interference filter 5, an imaging element 11, a detection signal processing unit 12, and a voltage control unit 13.

The optical module 10 guides measurement target light which is reflected from the measurement target X to the wavelength variable interference filter 5 through an input optical system (not illustrated), and receives the light which has passed through the wavelength variable interference filter 5 using the imaging element 11. In addition, a detection signal which is output from the imaging element 11 is output to the control unit 30 through the detection signal processing unit 12.

Configuration of Wavelength Variable Interference Filter

Figure 2:
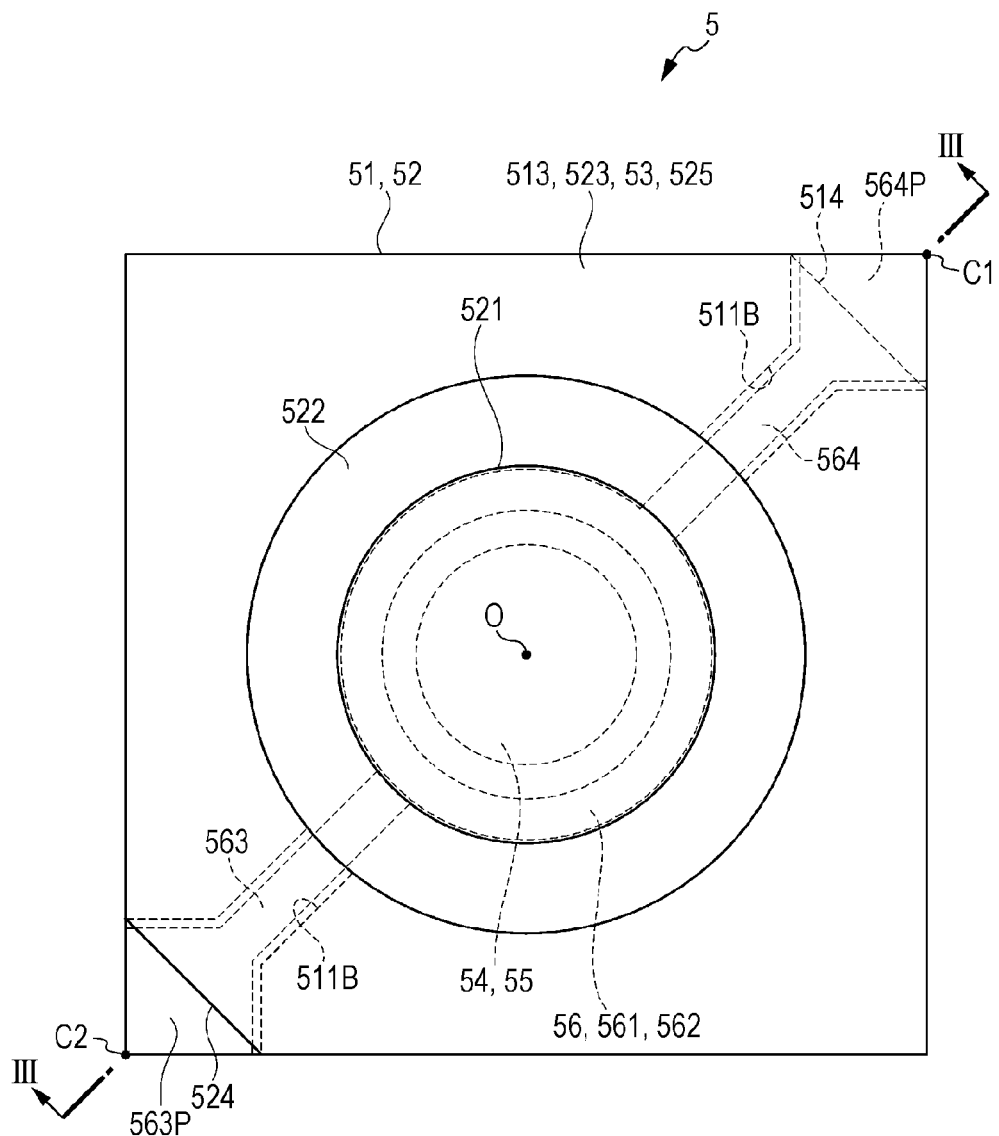
FIG. 2 is a plan view which illustrates a schematic configuration of a wavelength variable interference filter according to the first embodiment.
Figure 3:
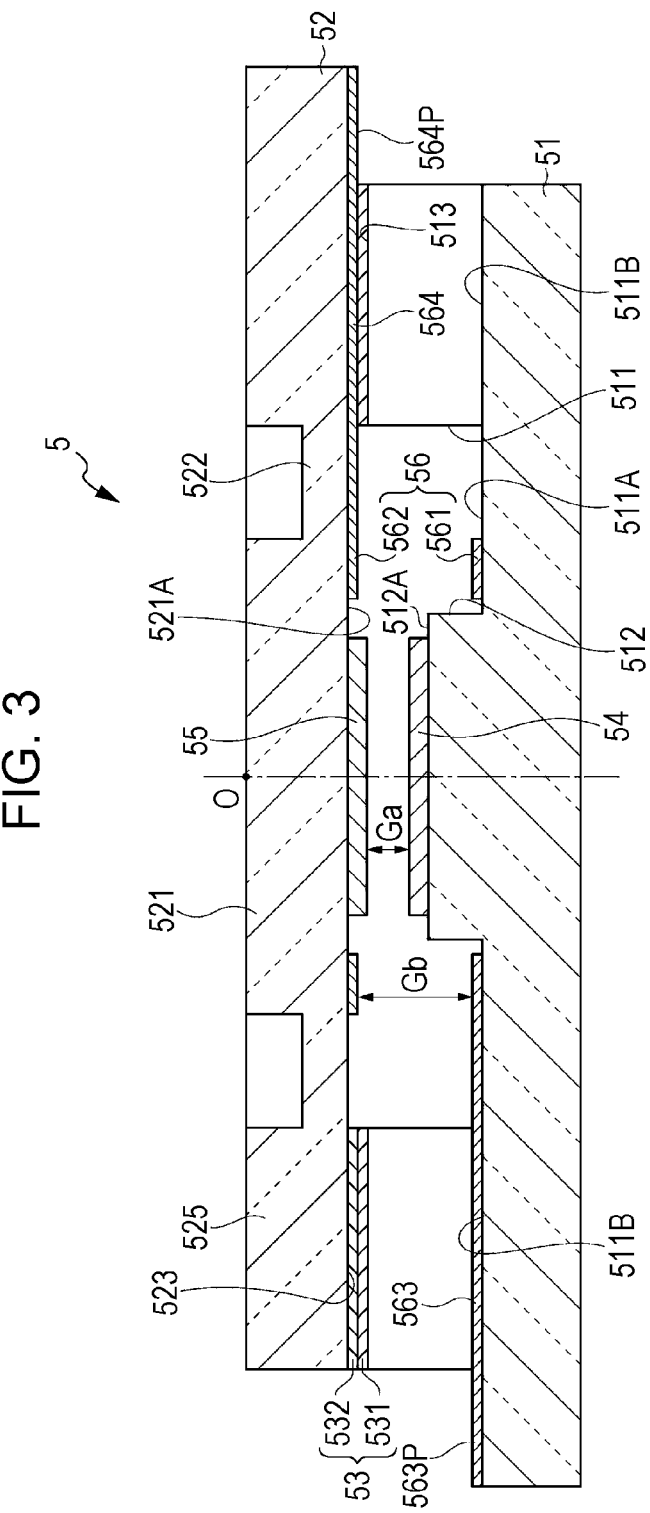
FIG. 3 is a cross-sectional view which illustrates a schematic configuration of the wavelength variable interference filter according to the first embodiment.

FIG. 2 is a plan view which illustrates a schematic configuration of the wavelength variable interference filter. FIG. 3 is a cross-sectional view of the wavelength variable interference filter which is taken along line III-III in FIG. 2.

The wavelength variable interference filter 5 corresponds to a spectral filter in the invention, and a variable wavelength-type Fabry-Perot etalon. The wavelength variable interference filter 5 is a rectangular plate-shaped optical member, for example, and includes a fixed board 51 which is formed with a thickness of approximately 500 μm, for example, and a movable board 52 which is formed with a thickness of approximately 200 μm, for example. These fixed board 51 and movable board 52 are respectively formed using, for example, various types of glass such as soda glass, crystalline glass, quartz glass, flint glass, potassium glass, borosilicate glass, or alkali-free glass, or crystal, or the like. In addition, the fixed board 51 and the movable board 52 are integrally configured when a first bonding unit 513 of the fixed board 51 and a second bonding unit 523 of the movable board are bonded using a bonding film 53 (first bonding film 531 and second bonding film 532) which is configured using a plasma polymerized film, or the like, of which a main component is siloxane, for example.

A fixed reflecting film 54 is provided on the fixed board 51, and a movable reflecting film 55 is provided on the movable board 52. This fixed reflecting film 54 and the movable reflecting film 55 are arranged so as to face each other across a gap Ga. In addition, an electrostatic actuator 56 for adjusting (changing) a size of the gap Ga is provided in the wavelength variable interference filter 5.

In addition, in a planar view (hereinafter, referred to as filter planar view) in FIG. 2 in which the wavelength variable interference filter 5 is viewed in the board thickness direction of the fixed board 51 (movable board 52), planar center points O of the fixed board 51 and movable board 52 match a center point of the fixed reflecting film 54 and the movable reflecting film 55, and match a center point of a movable unit 521 which will be described later.

Configuration of Fixed Board

An electrode arranging groove 511 and a reflecting film arranging unit 512 are formed on the fixed board 51 using etching. A thickness of the fixed board 51 is formed so as to be large with respect to the movable board 52, and there is no bending of the fixed board 51 due to electrostatic attraction or an internal stress of a fixed electrode 561, when a voltage is applied between the fixed electrode 561 and the movable electrode 562.

In addition, a notch portion 514 is formed at an apex C1 of the fixed board 51, and a movable electrode pad 564P which will be described later is exposed to the fixed board 51 side of the wavelength variable interference filter 5.

The electrode arranging groove 511 is formed in a ring shape about the planar center point O of the fixed board 51 in a filter planar view. The reflecting film arranging unit 512 is formed on the movable board 52 side by protruding from a center portion of the electrode arranging groove 511. A groove base of the electrode arranging groove 511 becomes an electrode arranging face 511A on which the fixed electrode 561 is arranged. In addition, a protruding tip end face of the reflecting film arranging unit 512 becomes a reflecting film arranging face 512A.

In addition, an electrode lead groove 511B which extends toward the apex C1 and an apex C2 on the outer edge of the fixed board 51 from the electrode lead groove 511 is provided on the fixed board 51.

The fixed electrode 561 which configures the electrostatic actuator 56 is provided on the electrode arranging face 511A of the electrode arranging groove 511. More specifically, the fixed electrode 561 is provided in a region facing the movable electrode 562 of the movable unit 521 which will be described later, in the electrode arranging face 511A. In addition, there may be a configuration in which an insulating film for securing insulation between the fixed electrode 561 and the movable electrode 562 is stacked on the fixed electrode 561.

In addition, the fixed extraction electrode 563 which extends in a direction toward the apex C2 from the outer edge of the fixed electrode 561 is provided on the fixed board 51. An extended tip end portion of the fixed extraction electrode 563 (portion at which apex C2 of the fixed board 51 is located) configures a fixed electrode pad 563P which is connected to the voltage control unit 13.

In addition, according to the embodiment, a configuration in which one fixed electrode 561 is provided on the electrode arranging face 511A is illustrated; however, for example, there may be a configuration in which two electrodes which form a concentric circle about the planar center point O are provided (double electrode configuration), or the like.

The reflecting film arranging unit 512 is formed in an approximately columnar shape with a diameter which is smaller than that of the electrode arranging groove 511 on the same axis of the electrode arranging groove 511, and includes the reflecting film arranging face 512A which faces the movable board 52 of the reflecting film arranging unit 512.

As illustrated in FIG. 3, in the reflecting film arranging unit 512, the fixed reflecting film 54 is provided. As the fixed reflecting film 54, it is possible to use, for example, a film of metal such as Ag, or film of an alloy such as an Ag alloy. In addition, a dielectric multilayer film in which a highly refractive layer is set to $TiO_2$, and a low refractive layer is set to $SiO_2$ may be used. In addition, a reflecting film which is formed by stacking a metal film (or alloy film) on a dielectric multilayer film, a reflecting film which is formed by stacking a dielectric multilayer film on a metal film (or alloy film), a reflecting film which is formed by stacking a single refractive layer ($TiO_2$, $SiO_2$, or the like) on a metal layer (or alloy layer), or the like may be used.

In addition, an antireflection film may be formed at a position corresponding to the fixed reflecting film 54, on a light input face (face on which fixed reflecting film 54 is not provided) of the fixed board 51. It is possible to form the antireflection film by alternately stacking a low refractivity index film and a high refractivity index film, and transmissivity is increased by decreasing reflectivity of visible light on the surface of the fixed board 51.

A face on which the electrode arranging groove 511, the reflecting film arranging unit 512, and the electrode lead groove 511B are not formed in the faces of the fixed board 51 which face the movable board 52 using etching configure the first bonding unit 513. A first bonding film 531 is provided on the first bonding unit 513, and when the first bonding film 531 is bonded to the second bonding film 532 which is provided on the movable board 52, the fixed board 51 and the movable board 52 are bonded to each other, as described above.

Configuration of Movable Board

In a plan view of the filter which is illustrated in FIG. 2, the movable board 52 includes a circular movable unit 521 of which a center is the planar center point O, a holding unit 522 which has the same axis as the movable unit 521, and holds the movable unit 521, and a board outer peripheral portion 525 which is provided on the outer side of the holding unit 522.

In addition, as illustrated in FIG. 2, the notch portion 524 is formed on the movable board 52 by corresponding to the apex C2, and the fixed electrode pad 563P is exposed when the wavelength variable interference filter 5 is viewed from the movable board 52 side.

The thickness of the movable unit 521 is formed so as to be larger than that of the holding unit 522. For example, according to the embodiment, the thickness of the movable unit 521 is formed so as to have the same thickness as that of the movable board 52. In a plan view of the filter, a diameter of the movable unit 521 is formed so as to be larger than at least that of the outer peripheral edge of the reflecting film arranging face 512A. In addition, the movable electrode 562 and the movable reflecting film 55 are provided in the movable unit 521.

In addition, similarly to the fixed board 51, an antireflection film may be formed on a face on the opposite side to the fixed board 51 of the movable unit 521. Such an antireflection film is formed by alternately stacking a low refractivity index film and a high refractivity index film, and it is possible to increase transmissivity by decreasing reflectivity of visible light on the surface of the movable board 52.

The movable electrode 562 faces the fixed electrode 561 across a gap Gb, and is formed in a ring shape which is the same shape as that of the fixed electrode 561. The movable electrode 562 configures the electrostatic actuator along with the fixed electrode 561. In addition, the movable board 52 includes a movable lead electrode 564 which extends toward the apex C1 of the movable board 52 from the outer peripheral edge of the movable electrode 562. An extending tip end portion of the movable lead electrode 564 (portion located at apex C1 of movable board 52) configures the movable electrode pad 564P which is connected to the voltage control unit 13.

The movable reflecting film 55 is provided so as to face the fixed reflecting film 54 across the gap Ga at a center portion of the movable face 521A of the movable unit 521. As the movable reflecting film 55, a reflecting film which has the same configuration as that of the fixed reflecting film 54, which is described above, is used.

In addition, according to the embodiment, as described above, an example in which a size of the gap Gb is larger than that of the gap Ga is described; however, there is no limitation to this. There may be a configuration in which the size of the gap Ga is larger than that of the gap Gb depending on a wavelength range of the measurement target light, for example, when infrared ray or far-infrared ray is used as the measurement target light, or the like.

The holding unit 522 is a diaphragm which surrounds the periphery of the movable unit 521, and is formed so as to have a smaller width than that of the movable unit 521. The holding unit 522 is easily bent compared to the movable unit 521, and causes the movable unit 521 to be displaced to the fixed board 51 side using slight electrostatic attraction. At this time, since the thickness of the movable unit 521 is larger than that of the holding unit 522, and rigidity of the movable unit increases, even when the holding unit 522 is pulled toward the fixed board 51 side due to the electrostatic attraction, a shape of the movable unit 521 does not change. Accordingly, bending of the movable reflecting film 55 which is provided in the movable unit 521 does not occur, and, it is usually possible to maintain the fixed reflecting film 54 and the movable reflecting film 55 in a state of being parallel to each other.

In addition, according to the embodiment, the diaphragm-shaped holding unit 522 is exemplified; however, there is no particular limitation to this, and, for example, there may be a configuration in which beam-shaped holding units which are arranged at equal angular intervals are provided about the planar center point O, or the like.

As described above, the board outer peripheral portion 525 is provided on the outer side of the holding unit 522 in the filter planar view. A face of the board outer peripheral portion 525 facing the fixed board 51 includes the second bonding unit 523 which faces the first bonding unit 513. In addition, the second bonding film 532 is provided in the second bonding unit 523, and as described above, the fixed board 51 and the movable board 52 are bonded when the second bonding film 532 is bonded to the first bonding film 531.

Configuration of Imaging Element, Detection Signal Processing Unit, and Voltage Control Unit Subsequently, returning to FIG. 1, the optical module 10 will be described.

The imaging element 11 receives (detects) light which passed through the wavelength variable interference filter 5, and outputs a detection signal based on a received light intensity to the detection signal processing unit 12. As the imaging element 11, it is possible to use various image sensors such as a CCD, CMOS, or the like.

The detection signal processing unit 12 amplifies the input detection signal (analog signal), converts the signal into a digital signal, and outputs the signal to the control unit 30. The detection signal processing unit 12 is configured of an amplifier which amplifies the detection signal, an AD converter which converts an analog signal into a digital signal, or the like.

The voltage control unit 13 applies a driving voltage to the electrostatic actuator 56 of the wavelength variable interference filter 5 based on control of the control unit 30. In this manner, electrostatic attraction occurs between the fixed electrode 561 and the movable electrode 562 of the electrostatic actuator 56, and the movable unit 521 is displaced to the fixed board 51 side.

Configuration of Display Unit and Operation Unit

The display unit 21 may be configured using various display panels such as a liquid crystal panel, a plasma display panel (PDP), and an organic EL display panel, for example. The display unit 21 displays a real time image, or the like, based on a control of the control unit 30.

The operation unit 22 is configured using various units which are capable of detecting a user operation such as a mouse, a keyboard, and a touch panel, for example.

Configuration of Control Unit

Subsequently, the control unit 30 of the spectrometry device 1 will be described.

The control unit 30 is configured by combining a CPU, a memory, or the like, for example, and controls the entire operation of the spectrometry device 1. The control unit 30 includes a filter driving unit 31, a light intensity obtaining unit 32, a composition unit 33, a display control unit 34, a spectrometry unit 35, and a storage unit 36, as illustrated in FIG. 1.

In addition, the storage unit 36 stores various programs for controlling the spectrometry device 1, or various data items. The data is, for example, V-λ data which denotes a wavelength of transmitted light with respect to a driving voltage which is applied to the electrostatic actuator 56, or information related to a measurement wavelength when measuring the measurement target X (measurement start wavelength, changing interval of wavelength, measurement ending wavelength, or the like).

The filter driving unit 31 sets a target wavelength of light which is taken out using the wavelength variable interference filter 5, and outputs a command signal for applying a driving voltage corresponding to the set target wavelength to the electrostatic actuator 56 to the voltage control unit 13 based on the V-λ data.

The light intensity obtaining unit 32 outputs a detection signal corresponding to the received light intensity to the imaging element 11, and obtains the detection signal through the detection signal processing unit 12. In addition, the light intensity obtaining unit 32 obtains a received light intensity of the transmitted light of the wavelength variable interference filter 5 in each pixel of the imaging element 11 based on the obtained detection signal, and obtains a spectroscopic image. The obtained spectroscopic image is correlated with the measurement wavelength at a time of detecting, as necessary, and is stored in the storage unit 36. In addition, in the storage unit 36, image data of the spectroscopic image may be stored by being correlated with information related to a received light intensity corresponding to each pixel (voltage value of detection signal, or the like) and a measurement wavelength, not the image data as is.

The composition unit 33 generates a composite image by compositing three color images which are spectroscopic images corresponding to each color light of red (R), green (G), and blue (B).

More specifically, the composition unit 33 generates a composite image by compositing a red image corresponding to red light in a red wavelength range, a green image corresponding to green light in a green wavelength range, and a blue image corresponding to blue light in a blue wavelength range among light beams from the measurement target X.

The display control unit 34 causes the display unit 21 to display a composite image which is generated by the composition unit 33 as a real time image. In addition, various images such as a spectrometry result are also displayed on the display unit 21, in addition to this.

The spectrometry unit 35 measures a spectral property of the measurement target light of a based on light intensity which is obtained using the light intensity obtaining unit 32.

Outline of Operations of Spectrometry Device

Subsequently, an outline of the above described operations of the spectrometry device 1 will be described based on drawings.

In the spectrometry device 1, a process of a real time display in which a composite image in which color images of each color of R, G, and B which are captured using the optical module 10 are composited is displayed on the display unit 21 as a real time image is performed. In this manner, a user is able to easily set a measurement position for performing a spectrometry process of the measurement target X while referring to a real time display.

Here, in the spectrometry device 1 according to the embodiment, a red image, a green image, and a blue image are sequentially obtained in a predetermined order when performing a real time display process and a spectrometry process.

Hereinafter, a wavelength which is an obtaining target of a color image, and an example of obtaining order of a color image in the spectrometry device 1 according to the embodiment will be described.

Figure 4:
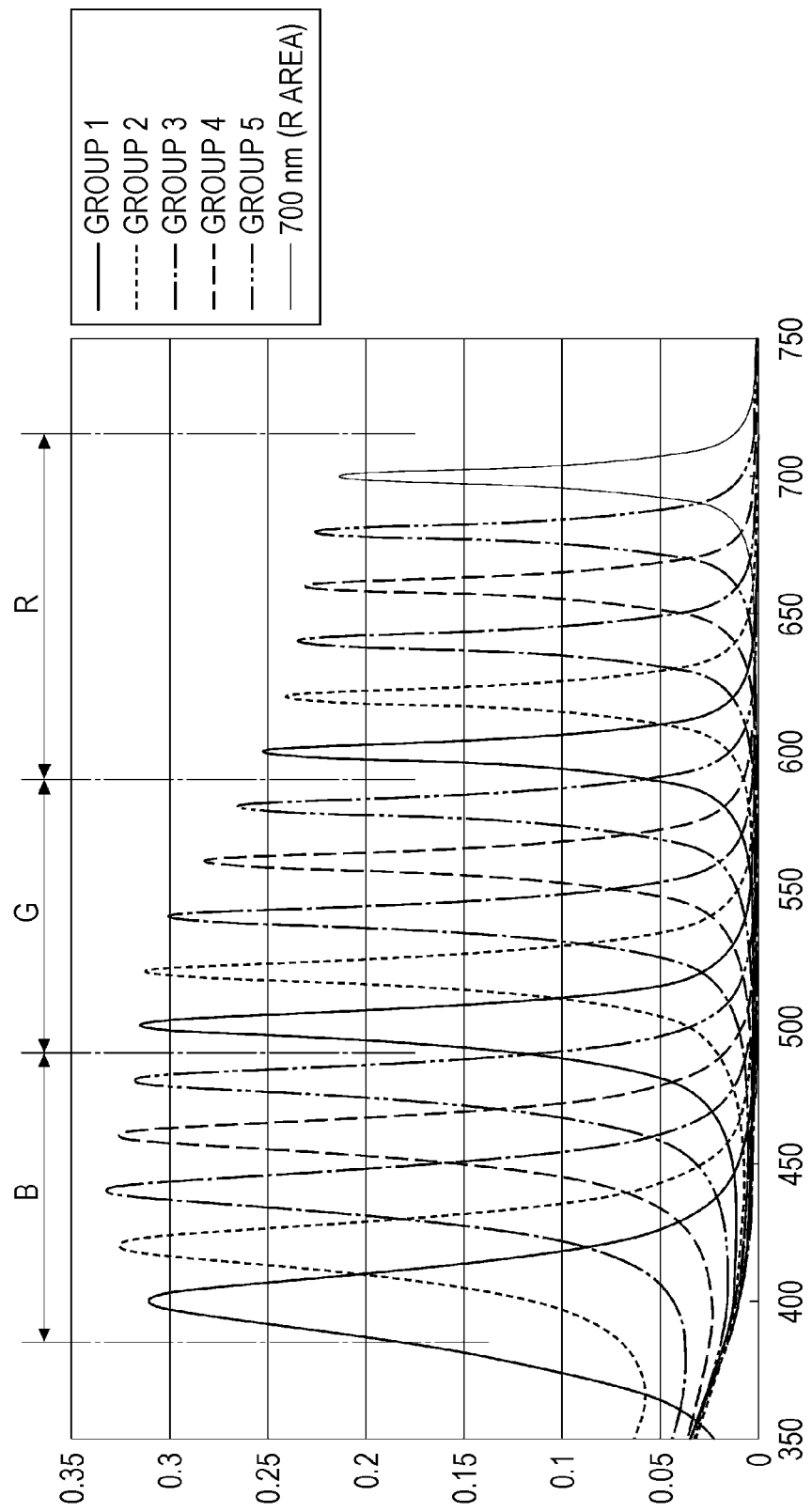
FIG. 4 is a graph which illustrates an example of a target wavelength.

FIG. 4 is a graph which illustrates examples of wavelengths as obtaining targets when performing the real time display process and the spectrometry process.

As illustrated in FIG. 4, according to the embodiment, a measurement wavelength range is divided into three wavelength ranges of a red wavelength range (for example, within a range of 600 nm to 700 nm, and also referred to as R range, hereinafter), a green wavelength range (for example, within a range of 500 nm to 580 nm, and also referred to as G range, hereinafter), and a blue wavelength range (for example, within a range of 400 nm to 480 nm, and also referred to as B range, hereinafter).

In the respective wavelength ranges, wavelengths of a plurality of measurement targets (for example, target wavelengths at intervals of 20 nm as illustrated in FIG. 4) are set in advance. Specifically, as illustrated in FIG. 4, as target wavelengths of measurement targets, five wavelengths of 400 nm, 420 nm, 440 nm, 460 nm, and 480 nm are set with respect to the B range. In addition, five wavelengths of 500 nm, 520 nm, 540 nm, 560 nm, and 580 nm are set with respect to the G range. In addition, six wavelengths of 600 nm, 620 nm, 640 nm, 660 nm, 680 nm, and 700 nm are set with respect to the R range. That is, in the spectrometry device 1, wavelengths of sixteen measurement targets are set with respect to the measurement wavelength range, as an example.

In addition, according to the embodiment, five groups in which three wavelengths in which one wavelength is selected from each wavelength with respect to fifteen wavelengths except for 700 nm in the R range are set to one group are set as illustrated in the following Table 1. In addition, according to the embodiment, as an example, one group is set by selecting one wavelength in order from a small wavelength among each of wavelengths.

TABLE 1

|  | C = 1 (B range) | C = 2 (G range) | C = 3 (R range) |
|---|---|---|---|
| g = 1 (Group 1) | 400 | 500 | 600 |
| g = 2 (Group 2) | 420 | 520 | 620 |
| g = 3 (Group 3) | 440 | 540 | 640 |
| g = 4 (Group 4) | 460 | 560 | 660 |
| g = 5 (Group 5) | 480 | 580 | 680 |

In the spectrometry device 1, each color image corresponding to a set wavelength is obtained in order with respect to each group from the group 1 to the group 5. In addition, in the spectrometry device 1, color images corresponding to set wavelengths are obtained in order from a small wavelength, that is, in order of the B range, the G range, and the R range with respect to each group. In addition, with respect to a color image corresponding to 700 nm which is set in the R range, for example, the color image is obtained in a predetermined order which is arbitrarily set after obtaining a color image of 680 nm, or the like.

Specifically, in the spectrometry device 1, the filter driving unit 31 sets a target wavelength of the group 1 in order of the B range, the G range, and the R range. In this manner, light which is transmitted from the wavelength variable interference filter 5 is sequentially switched to 400 nm, 500 nm, and 600 nm, and the light intensity obtaining unit 32 obtains a B image corresponding to 400 nm, a G image corresponding to 500 nm, and an R image corresponding to 600 nm, respectively. Thereafter, the filter driving unit 31 similarly sets a target wavelength of the group 2 in order as described above, and the light intensity obtaining unit 32 obtains each color image corresponding to these set target wavelengths. Hereinafter, by performing the same process, color images of 15 wavelengths corresponding to each target wavelength from the group 1 to the group 5 are sequentially obtained.

That is, the filter driving unit 31 changes a target wavelength in the B range (blue wavelength) every time a B image is obtained, changes a target wavelength in the G range (green wavelength) every time a G image is obtained, and changes a target wavelength in the R range (red wavelength) every time an R image is obtained.

In addition, the control unit 30 stores a group variable g (g=1 to 5, and maximum value of group variable g, gmax=5 in embodiment) which specifies a group of an obtaining target, and a color variable C (C=1 to 3) which specifies a color of the obtaining target (refer to Table 1). In addition, the control unit 30 specifies a target wavelength related to a color image which is the subsequent obtaining target by appropriately changing a group variable g and a color variable C every time a color image is obtained. For example, when (g, C)=(2, 3), 620 nm which is a wavelength in the R range of the group 2 is the subsequent target wavelength.

Operations of Spectrometry Device

A specific example of the operation of the spectrometry device 1 will be described below based on drawings.

Figure 5:
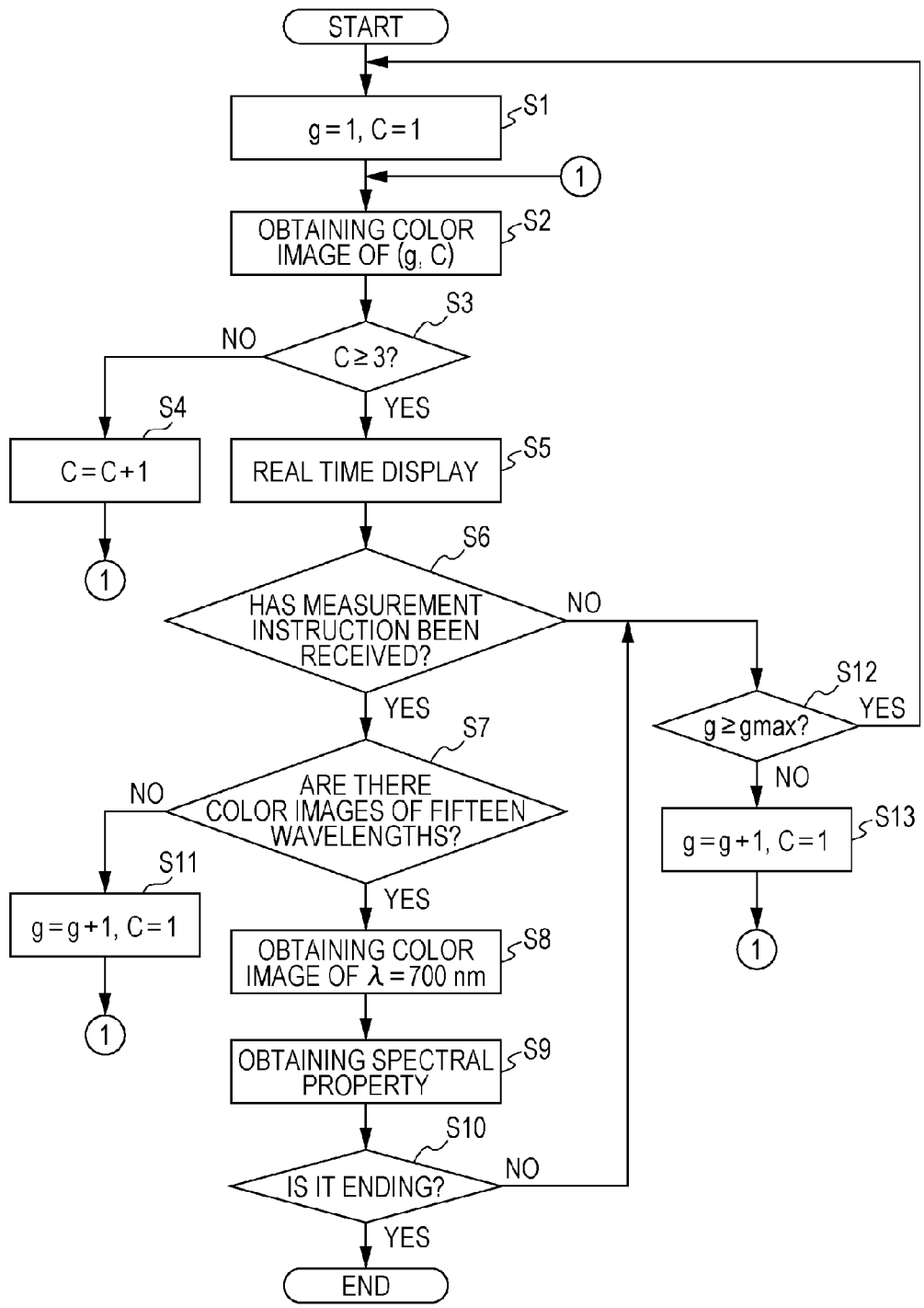
FIG. 5 is a flowchart which illustrates an example of operations of the spectrometry device according to the first embodiment.

FIG. 5 is a flowchart which illustrates an example of operations using the spectrometry device 1.

As illustrated in FIG. 5, in the spectrometry device 1, the filter driving unit 31 initializes the group variable g and the color variable C, that is, sets the group variable g and the color variable C to 1 (step S1).

Subsequently, the spectrometry device 1 obtains a color image corresponding to values of the group variable g and the color variable C (g, C) which are currently set (step S2). In step S2, the obtained color image is stored in the storage unit 36. In addition, according to the embodiment, the latest color images corresponding to fifteen wavelengths which are denoted in Table 1 are stored. Accordingly, the latest color images corresponding to fifteen wavelengths are updated every time a color image is obtained.

Specifically, the filter driving unit 31 refers to the values of the group variable g and the color variable C (g, C), and specifies a target wavelength. In the filter driving unit 31, for example, as denoted in Table 1, when (g, C)=(1, 1), λ=400 nm is specified as a target wavelength, and when (g, C)=(3, 2), λ=540 nm is specified as a target wavelength.

In addition, in the wavelength variable interference filter 5, a size of a gap Ga between reflecting films is set to a value corresponding to a target wavelength due to the filter driving unit 31. In addition, light with a wavelength corresponding to a size of the gap Ga is output from the wavelength variable interference filter 5, and the light is received in the imaging element 11. The light intensity obtaining unit 32 obtains a color image of (g, C) based on a detection signal from the imaging element 11.

After step S2, the composition unit 33 determines whether or not three color images corresponding to one group have been obtained by determining whether or not the color variable C is three or more (step S3).

When No is determined in step S3, the control unit 30 adds 1 to the color variable C (step S4), and the process returns to step S2.

Meanwhile, when Yes is determined in step S3, the control unit 30 performs a real time display (step S5).

That is, the composition unit 33 generates a composite image using each color image of the latest one group among the obtained color images. For example, after obtaining all of color images of the group variable g=4, that is, of the group 4, a composite image in which a B image with the wavelength λ=460 nm, a G image with the wavelength λ=560 nm, and an R image with the wavelength λ=660 nm, which are included in the group 4, are composited is generated. In addition, the display control unit 34 causes the display unit 21 to display the generated composite image as a real time image.

After performing the real time display, the control unit 30 determines whether or not an execution instruction for the spectrometry process from a user, that is, a measurement instruction has been received (step S6). In addition, the control unit 30 sets a value a flag F to 1 when receiving the measurement instruction from the user. In step S6, the control unit 30 determines that the measurement instruction has been received when the value of the flag F is 1, and determines that the measurement instruction has not been received when the value of the flag F is 0.

When it is determined that the measurement instruction has been received in step S6 (Yes in step S6), the control unit 30 determines whether or not color images of fifteen wavelengths which are denoted in Table 1 have already been obtained, and are stored in the storage unit 36 (step S7).

When it is determined that the color images of fifteen wavelengths have already been obtained (Yes in step S7), the control unit 30 subsequently obtains an R image corresponding to the wavelength λ=700 nm (step S8). In this manner, all of color images of sixteen wavelengths which are preset are obtained.

Subsequently, the spectrometry unit 35 obtains spectral spectrum using all of color images of sixteen wavelengths (step S9). The spectrometry unit 35 calculates an optical spectrum of a measurement target using a light intensity which is calculated with respect to each wavelength. In addition, in step S9, the control unit 30 initializes a value of the flag F (that is, F is set to 0).

Subsequently, whether or not an end instruction from the user has been received is determined (step S10). The control unit 30 determines whether or not the end instruction is detected through the operation unit 22, and when the end instruction is detected (Yes in step S10), the process is ended.

Here, when it is determined that the color images of fifteen wavelengths have not yet been obtained in step S7 (No in step S7), even when it is determined that the measurement instruction has been received in step S6, the spectrometry device 1 sequentially obtains color images which have not yet been obtained among color images of fifteen wavelengths. That is, 1 is added to the group variable g, and a value of the color variable C is initialized (C=1) (step S11). In addition, the spectrometry device 1 returns to step S2, and repeats processes until color images of fifteen wavelengths are obtained.

At this time, the value of flag F is not reset until a process of obtaining a spectral property in step S9, which will be described later, is performed. For this reason, when a measurement instruction from the user is received once, the value of flag F is maintained at 1 until being reset in step S9, and in step S7, the determination that the measurement instruction is received is repeated.

Meanwhile, when it is determined that the measurement instruction from the user has not been received in step S6 (F=0, and No in step S6), and it is determined that an end instruction has not been received in step S10 (No in step S10), the spectrometry device 1 sequentially obtains color images of fifteen wavelengths continuously.

Specifically, whether or not the group variable g is the maximum value gmax (5 in the embodiment) or more is determined (step S12).

In addition, in step S12, when it is determined that the group variable g is not the maximum value gmax or more (No in step S12), the control unit 30 adds 1 to the group variable g, initializes the value of the color variable C (step S13), returns to step S2, and repeats the following processes.

Meanwhile, in step S12, when it is determined that the value of the group variable g is the maximum value gmax or more (Yes in step S12), since color images of fifteen wavelengths have been obtained, the control unit 30 returns to step S1, initializes the group variable g and the value of the color variable C, and repeats the following processes.

In addition, when it is determined that the measurement instruction has not been received in step S6, the control unit 30 may perform the determination of whether or not the end instruction from the user has been received. When it is determined that the end instruction has not been received, the control unit 30 performs the process in step S12, and ends the process when it is determined that the end instruction has been received.

Operational Effect of First Embodiment

In the spectrometry device 1, color light beams respectively corresponding to the R range, the G range, and the B range are sequentially output from the wavelength variable interference filter 5, and three color images which are spectroscopic images which respectively correspond to each color light are sequentially obtained. Accordingly, by compositing the latest R image, G image, and B image, it is possible to display a highly accurate real time image.

In addition, a wavelength which is output from the wavelength variable interference filter 5 is changed in each color wavelength range every time each color image is obtained. For example, a red wavelength is changed every time an R image is obtained. In this manner, a wavelength which is output from the wavelength variable interference filter 5 is changed in each color wavelength range, and when light intensities with respect to these plurality of wavelengths are obtained, it is possible to perform highly accurate spectrometry based on the obtained light intensities.

As described above, in the spectrometry device 1 according to the embodiment, it is possible to generate a composite image using the obtained three color images while obtaining color images corresponding to plurality of wavelengths which are necessary for spectrometry, and to perform both the real time display and the spectrometry at the same time.

In addition, the spectrometry device 1 stores the latest color images of fifteen wavelengths, and performs an analysis process using the stored color images.

For this reason, it is possible to store most of color images which are necessary for an analysis process at a point of time in which a user gives a measurement instruction while referring to a real time display. Accordingly, it is possible to omit or shorten a measurement time which is necessary for obtaining all of color images which are necessary for the above described analysis process after receiving an instruction from a user.

In addition, the spectrometry device 1 adopts a configuration in which an R image corresponding to a wavelength $\lambda=700$ nm which is not used in a real time display is obtained after receiving a measurement instruction. In such a configuration, since a color image which is not used in a real time display is not obtained until a measurement instruction is received, it is possible to update a composite image every time three color images are obtained. Accordingly, it is possible to suppress deterioration in frame rate of a composite image which is caused when a color image which is not used in the real time display is obtained.

In addition, the spectrometry device 1 may be configured so that all of color images of sixteen wavelengths including the R image corresponding to the wavelength $\lambda=700$ nm are sequentially obtained regardless of the measurement instruction. For example, the R image corresponding to the wavelength $\lambda=700$ nm may be obtained after a color image corresponding to the wavelength $\lambda=680$ nm. In this case, it is possible to store all of the color images which are necessary for an analysis process at a point of time in which the measurement instruction is performed, and to perform the analysis process at a timing in which the measurement instruction is received.

Here, in the first embodiment, a configuration in which a target wavelength is changed so that color images are sequentially obtained from a small wavelength among set wavelengths with respect to each color wavelength range has been exemplified; however, the invention is not limited to this, and the wavelengths may be changed in an order which is preset, using an arbitrary method in each of wavelength ranges, respectively. For example, a configuration may be adopted in which a target wavelength is changed so that color images are obtained in an order from a large wavelength in each wavelength range.

In addition, in the first embodiment, a configuration is adopted in which the latest color images of fifteen wavelengths are stored in the storage unit 36; however, a configuration may be adopted in which color images which are obtained before the latest color images of fifteen wavelengths are also stored.

In addition, a configuration may be adopted in which color images of fewer than fifteen wavelengths are stored, and a color image with a wavelength which is not stored is obtained among color images with wavelengths which are necessary for an analysis process, after receiving a measurement instruction.

Second Embodiment

Hereinafter, a second embodiment of the invention will be described.

In the first embodiment, a configuration in which a target wavelength is set so as to become sequentially large among a set plurality of wavelengths in each wavelength range has been described.

In contrast to this, the embodiment is different from the first embodiment in a point that a target wavelength is sequentially changed so that an amount of change in the target wavelength is in a predetermined threshold value in each wavelength range.

Also in the embodiment, similarly to the first embodiment, as illustrated in FIG. 4, sixteen wavelengths of respective five wavelengths with respect to the B range and G range, and six wavelengths with respect to the R range are set as target wavelengths.

According to the embodiment, five groups in which three wavelengths formed by selecting one wavelength from each wavelength range are set to one group with respect to fifteen wavelengths except for 700 nm in the R range are set as denoted in the following Table 2.

TABLE 2

| | C = 1 (B range) | C = 2 (G range) | C = 3 (R range) |
|---|---|---|---|
| g = 1 (Group 1) | 400 | 500 | 600 |
| g = 2 (Group 2) | 440 | 540 | 640 |
| g = 3 (Group 3) | 480 | 580 | 680 |
| g = 4 (Group 4) | 460 | 560 | 660 |
| g = 5 (Group 5) | 420 | 520 | 620 |

Also in the embodiment, the spectrometry device obtains color images in order with respect to each group from the group 1 to group 5.

That is, according to the embodiment, a target wavelength is sequentially changed within a range of a predetermined value (corresponding to predetermined amount of change in the invention) in each of the wavelength ranges. As denoted in Table 2, with respect to the B range, the target wavelength is changed to 400 nm, 440 nm, 480 nm, 460 nm, and 420 nm, for example. Accordingly, the target wavelength is changed so as to be an amount of change in wavelength of 40 nm or less with respect to the B range. The same applies to the G range and the R range.

Specifically, according to the embodiment, target wavelengths are sequentially set in an order of 400 nm, 500 nm, and 600 nm in the group 1, 440 nm, 540 nm, and 640 nm in the group 2, 480 nm, 580 nm, and 680 nm in the group 3, 460 nm, 560 nm, and 660 nm in the group 4, and 420 nm, 520 nm, and 620 nm in the group 5.

In addition, also in the embodiment, a red image corresponding to the wavelength $\lambda=700$ nm may be obtained after a determination that a measurement instruction has been received is made, similarly to that in the first embodiment, or may be obtained at a predetermined timing, for example, after obtaining a color image corresponding to the wavelength $\lambda=680$ nm.

Operational Effect of Second Embodiment

In the second embodiment, a wavelength of output light from the wavelength variable interference filter 5 is changed so as to have an amount of change in wavelength within a range of a predetermined threshold value in each wavelength range. More specifically, for example, the wavelength of the output light is changed so that the amount of change in wavelength is 40 nm or less in each wavelength range.

Here, when an amount of change in wavelengths between color images which are consecutively obtained exceeds a predetermined range in the same wavelength range, there is a case in which grayscale values between composite images generated using each color image which is consecutively obtained is remarkably changed even when images of the same imaging target are captured. In this case, there is a case in which hue of a displayed real time image is changed every time a real time display is updated.

For example, when wavelengths of 500 nm, 520 nm, 540 nm, 560 nm, and 580 nm are set with respect to the green wavelength range, there is a difference of 80 nm between 500 nm which is a wavelength close to a blue color and 580 nm which is a wavelength close to a red color. Accordingly, when a composite image which is generated using a color image of 580 nm is displayed after displaying a composite image which is generated using a color image of 500 nm, there is a concern that hue may suddenly fluctuate when updating a real time image.

In contrast to this, since a wavelength of output light is changed so that an amount of change in wavelength is within a range of the predetermined threshold value, it is possible to suppress a change in hue of a real time image.

Here, according to the embodiment, a case in which an amount of change in wavelength is 40 nm or less as a range of the predetermined threshold value is exemplified. The above described predetermined threshold value is a maximum value of an amount of change in wavelength in which a change in hue between color images is in an allowable range in each composite image (for example, between group 1 and group 2) which is formed using respective color images which are consecutively obtained, and is preset through an experiment, or the like.

In addition, according to the embodiment, a configuration in which a wavelength is changed so that the wavelength increases by 40 nm between the group 1 and group 2, and between the group 2 and group 3, and decreases by 20 nm between the group 3 and group 4, and decreases by 40 nm between the group 4 and group 5 with respect to each wavelength range is exemplified; however, the invention is not limited to this. That is, an amount of change in wavelength and a target wavelength are appropriately set so that the wavelength changing amount is in the range of the predetermined threshold value.

Third Embodiment

Hereinafter, a third embodiment of the invention will be described.

In the first embodiment, a configuration in which a target wavelength is set so that the target wavelength sequentially increases among a set plurality of wavelengths with respect to each wavelength range is described.

In contrast to this, the embodiment is different from the first embodiment in a point that a target wavelength is changed so that the target wavelength sequentially increases from a minimum value to a maximum value, and then sequentially decreases from the maximum value to the minimum value among a set plurality of wavelengths with respect to each wavelength range.

Also in the embodiment, similarly to that in the first embodiment, as illustrated in FIG. 4, sixteen wavelengths of five wavelengths with respect to the respective B region and G region, and six wavelengths with respect to the R region are set as target wavelengths.

In the embodiment, eight groups in which three wavelengths formed by selecting one wavelength from each wavelength range are set to one group with respect to fifteen wavelengths except for 700 nm in the R region are set as denoted in the following Table 3.

TABLE 3

|  | C = 1 (B range) | C = 2 (G range) | C = 3 (R range) |
| --- | --- | --- | --- |
| g = 1 (Group 1) | 400 | 500 | 600 |
| g = 2 (Group 2) | 420 | 520 | 620 |
| g = 3 (Group 3) | 440 | 540 | 640 |
| g = 4 (Group 4) | 460 | 560 | 660 |
| g = 5 (Group 5) | 480 | 580 | 680 |
| g = 6 (Group 6) | 460 | 560 | 660 |
| g = 7 (Group 7) | 440 | 540 | 640 |
| g = 8 (Group 8) | 420 | 520 | 620 |

In the embodiment, the spectrometry device obtains color images in order with respect to each group from the group 1 to group 8.

That is, in the embodiment, the filter driving unit 31 changes a wavelength so that the wavelength sequentially increases from a minimum value to a maximum value with respect to each wavelength range. In addition, when the wavelength reaches the maximum value, the filter driving unit 31 changes the wavelength so as to sequentially decrease from the maximum value to the minimum value. For example, with respect to the B range, a target wavelength is changed so as to increase to 400 nm, 420 nm, 440 nm, 460 nm, and 480 nm, and then the target wavelength is changed so as to decrease to 460 nm, 440 nm, and 420 nm. The same applies to the G range and the R range.

In addition, also in the embodiment, a red image corresponding to the wavelength $\lambda$=700 nm may be obtained after determining that a measurement instruction has been received, similarly to the first embodiment, or may be obtained at a predetermined timing, for example, after obtaining a color image corresponding to the wavelength X=680 nm.

Operational Effect of Third Embodiment

In the third embodiment, when a wavelength of output light from the wavelength variable interference filter 5 is sequentially changed, the wavelength is sequentially changed from a maximum wavelength to a minimum wavelength after being sequentially changed from the minimum wavelength to the maximum wavelength with respect to each wavelength range.

For example, as described above, when the wavelength in the green wavelength range (500 nm to 580 nm) is changed from the maximum wavelength (580 nm) to the minimum wavelength (500 nm), since the wavelength of the green image fluctuates by 80 nm, there is a concern that hue may suddenly fluctuate when updating the real time image.

In contrast to this, according to the embodiment, when the target wavelength reaches the maximum wavelength (580 nm), the target wavelength is changed toward the minimum wavelength (500 nm) again at intervals of 20 nm, for example. With such a configuration, it is possible to suppress the amount of change in wavelength, and to suppress a change in tone of a real time image, since the amount of change becomes approximately constant.

In addition, in the third embodiment, a wavelength is sequentially selected from a minimum value to a maximum value with respect to each wavelength range; however, the wavelength may be selected from the maximum value to the minimum value. In addition, the wavelength may not be sequentially selected from the maximum value or the minimum value, and the target wavelength may be sequentially changed from an arbitrary set wavelength.

Fourth Embodiment

Hereinafter, a fourth embodiment of the invention will be described.

In the first embodiment, a configuration in which a composite image in which color images of each color of R, G, and B which are obtained in each group is composited is generated, and a real time display is performed has been described.

In contrast to this, the embodiment is different from the first embodiment in a point that the embodiment is configured so that a grayscale of a composite image is corrected so that a grayscale is not remarkably changed between composite images which are respectively generated with respect to each group.

Figure 6:
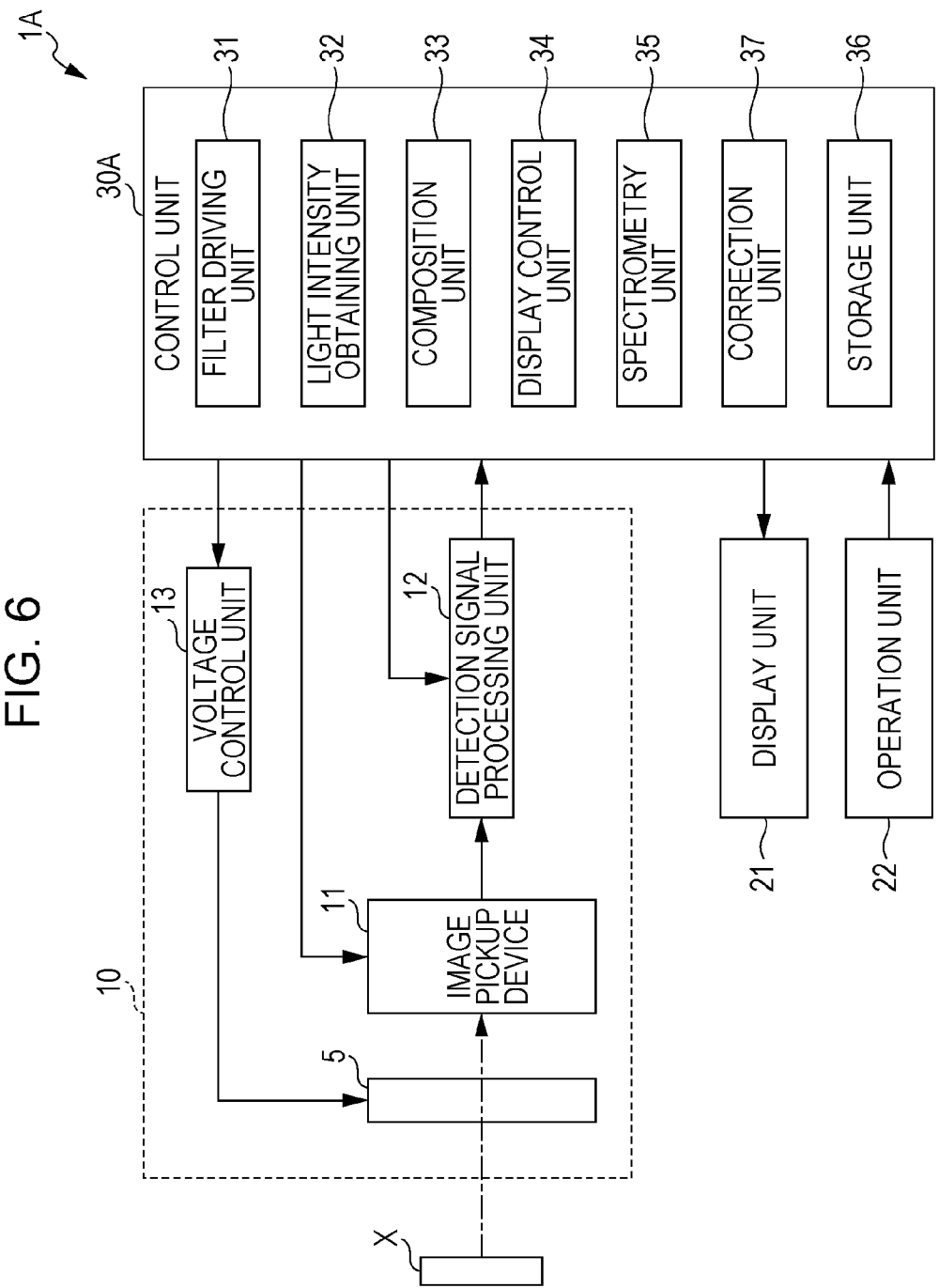
FIG. 6 is a block diagram which illustrates a schematic configuration of a spectrometry device according to a fourth embodiment of the invention.

FIG. 6 is a block diagram which illustrates a schematic configuration of a spectrometry device according to the embodiment.

As illustrated in FIG. 6, a spectrometry device 1A includes an optical module 10, a display unit 21, an operation unit 22, and a control unit 30A.

The control unit 30A includes a filter driving unit 31, a light intensity obtaining unit 32, a composition unit 33, a display control unit 34, a spectrometry unit 35, a storage unit 36, and a correction unit 37.

In addition, in the embodiment, similarly to the first embodiment, a case in which color images of sixteen wavelengths including fifteen wavelengths of the five groups denoted in Table 1, and the wavelength λ=700 nm are obtained will be described.

The correction unit 37 corrects a grayscale of a generated composite image in the real time display process in step S5 in FIG. 5.

For example, in the group 1 and the group 5, there is a difference of 80 nm between target wavelengths in each of wavelength ranges. For this reason, there is a difference in grayscale value between a composite image in which respective composite images of the group 1 are composited (hereinafter, also referred to as first composite image) and a composite image in which respective color images of the group 5 are composited (also referred to as fifth composite image), even when images of the same imaging target are captured. Accordingly, when the fifth composite image is displayed after displaying the first composite image, there is a concern that hue of a screen may be changed.

The correction unit 37 obtains respective grayscale values (correction values) of Rg (R range), Gg (G range), and Bg (B range) of the composite images of the group variable g using the following expression (1), for example.

Here, $\lambda_{Rg}$, $\lambda_{Gg}$, and $\lambda_{Bg}$ in the following expression (1) are target wavelengths corresponding to each color image as a generation source of a composite image of the group variable g (g=1 to 5). In addition, n ($\lambda_{Rg}$), n ($\lambda_{Gg}$), and n ($\lambda_{Bg}$) are measurement values (grayscale values) related to each color image corresponding to the group variable g.

In addition, $k_{Rg}$ ($\lambda_{Rg}$, $\lambda_{Gg}$, and $\lambda_{Bg}$) is a correction coefficient with respect to the R range of a composite image which is generated using color images corresponding to each target wavelength $\lambda_{Rg}$, $\lambda_{Gg}$, and $\lambda_{Bg}$. Similarly, $k_{Gg}$ ($\lambda_{Rg}$, $\lambda_{Gg}$, and $\lambda_{Bg}$) is a correction coefficient with respect to the G range, and $k_{Bg}$ ($\lambda_{Bg}$, $\lambda_{Gg}$, and $\lambda_{Bg}$) is a correction coefficient with respect to the B range.

$$\left.\begin{array}{l} Rg = n(\lambda_{Rg}) \times k_{Rg}(\lambda_{Rg}, \lambda_{Gg}, \lambda_{Bg}) \\ Gg = n(\lambda_{Gg}) \times k_{Gg}(\lambda_{Rg}, \lambda_{Gg}, \lambda_{Bg}) \\ Bg = n(\lambda_{Bg}) \times k_{Bg}(\lambda_{Rg}, \lambda_{Gg}, \lambda_{Bg}) \end{array}\right\} \quad (1)$$

In the spectrometry device 1A which is configured in this manner, color images are obtained in a predetermined order similarly to the first embodiment, and a composite image is generated when three color images corresponding to one group are obtained. At this time, the correction unit 37 calculates a grayscale value (correction value) Bg of the B range of a composite image by multiplying a measurement value n ($\lambda_{Bg}$) of a color image corresponding to, for example, (g, 1), that is, the wavelength $\lambda_{Bg}$ of the B range (C=1) by a correction coefficient $k_{Bg}$ ($\lambda_{Rg}$, $\lambda_{Gg}$, and $\lambda_{Bg}$) corresponding to a corresponding wavelength of a color image which is a generation source of the composite image. The same is applied to a grayscale value Rg of the R range, and a grayscale value Gg of the G range. In addition, the display control unit 34 causes the display unit 21 to display the corrected composite image using these grayscale values Rg, Gg, and Bg.

Here, the correction coefficient is preset so that a difference in grayscale value between corrected composite images is within a range of a predetermined second threshold value, that is, in an allowable range, when correcting a grayscale value of a plurality of composite images obtained by capturing images of the same imaging target. For example, when a composite image of one group is set to a reference image, a difference in hue between a composite image of another group and the reference image is set so as to be in the allowable range.

Specifically, for example, each of correction coefficients of $k_{Rg}$ ($\lambda_{Rg}$, $\lambda_{Gg}$, and $\lambda_{Bg}$), $k_{Gg}$ ($\lambda_{Rg}$, $\lambda_{Gg}$, and $\lambda_{Bg}$), and $k_{Bg}$ ($\lambda_{Rg}$, $\lambda_{Gg}$, and $\lambda_{Bg}$) is set so that respective differences between grayscale values of R, G, and B in the reference image and grayscale values of R, G, and B of another composite image of the group variable g are in the allowable range. That is, the correction coefficient corresponding to each target wavelength corresponding to respective color images of R, G, and B which are generation sources of a composite image is set with respect to the respective color images of R, G, and B which are the generation sources.

Here, each of correction coefficients of $k_{Rg}$ ($\lambda_{Rg}$, $\lambda_{Gg}$, and $\lambda_{Bg}$), $k_{Gg}$ ($\lambda_{Rg}$, $\lambda_{Gg}$, and $\lambda_{Bg}$), and $k_{Bg}$ ($\lambda_{Rg}$, $\lambda_{Gg}$, and $\lambda_{Bg}$) is predetermined using various calculations such as a multiple regression analysis, experiments, or the like, so that a difference in grayscale value between composite images after the correction is in the allowable range, and is stored in the storage unit 36. In addition, the allowable range of the difference in each of the grayscale values may be a value with which a user does not have a sense of unease in the difference in hue, and is appropriately set according to a desired accuracy, or the like.

In addition, each grayscale value of R, G, and B of the composite image may be corrected by multiplying each grayscale value of R, G, and B of another composite image by a correction coefficient, or the like, so that a difference between the composite image as the reference (reference image) and each grayscale value of R, G, and B of another composite image is in the allowable range, in addition to the above described method.

In addition, another color image may be corrected with respect to a reference color image corresponding to a representative wavelength by setting the representative wavelength in each wavelength range. For example, in the R range of the red wavelength range, a grayscale value of each R image is corrected by setting a center wavelength of 640 nm to a representative wavelength. In addition, the correction is similarly performed with respect to other ranges, and a composite image is generated using the corrected color image.

In addition, the correction coefficient may be set so that a difference in each grayscale value is in the allowable range between all of the composite images without setting one reference image. That is, each grayscale value of a composite image may be corrected so that a difference in grayscale value becomes a predetermined threshold value or less between a plurality of composite images.

Operational Effect of Fourth Embodiment

Also in the embodiment, a wavelength of each color image of R, G, and B (target wavelength) is changed every time each color image is obtained, and a composite image is generated when each of the latest color images is composited. When a target wavelength in each wavelength range is changed in this manner, there is a case in which a difference in grayscale value between a plurality of composite images exceeds the second threshold value even when images of the same target are captured. In this case, there is a concern that hue may fluctuate between composite images.

In contrast to this, in the embodiment, grayscale values of a plurality of composite images related to the same imaging target are corrected, and a difference in grayscale value between the plurality of composite images is set so as to be within the predetermined second threshold value. In this manner, it is possible to suppress a change in grayscale value which occurs due to fluctuation of a wavelength in each wavelength range, and to suppress a change in hue of a real time image between the plurality of composite images.

In addition, it is possible to suppress a change in hue of a composite image without setting a selecting order in which an amount of change in a wavelength of a color image is reduced, in each wavelength range, in order to perform a correction for suppressing a fluctuation in grayscale value of a composite image. For this reason, it is possible to change a wavelength of a color image in an arbitrary order.

Fifth Embodiment

Hereinafter, a fifth embodiment according to the invention will be described based on drawings.

In the first embodiment, a configuration in which all of color images corresponding to predetermined all wavelengths are obtained after receiving a measurement instruction has been described.

In contrast to this, the embodiment is different from the first embodiment in a point that obtained color images are stored as at least all of color images of predetermined all wavelengths (above described sixteen wavelengths) while performing a real time display, and obtains a measurement result at a timing at which a measurement instruction is received.

Figure 7:
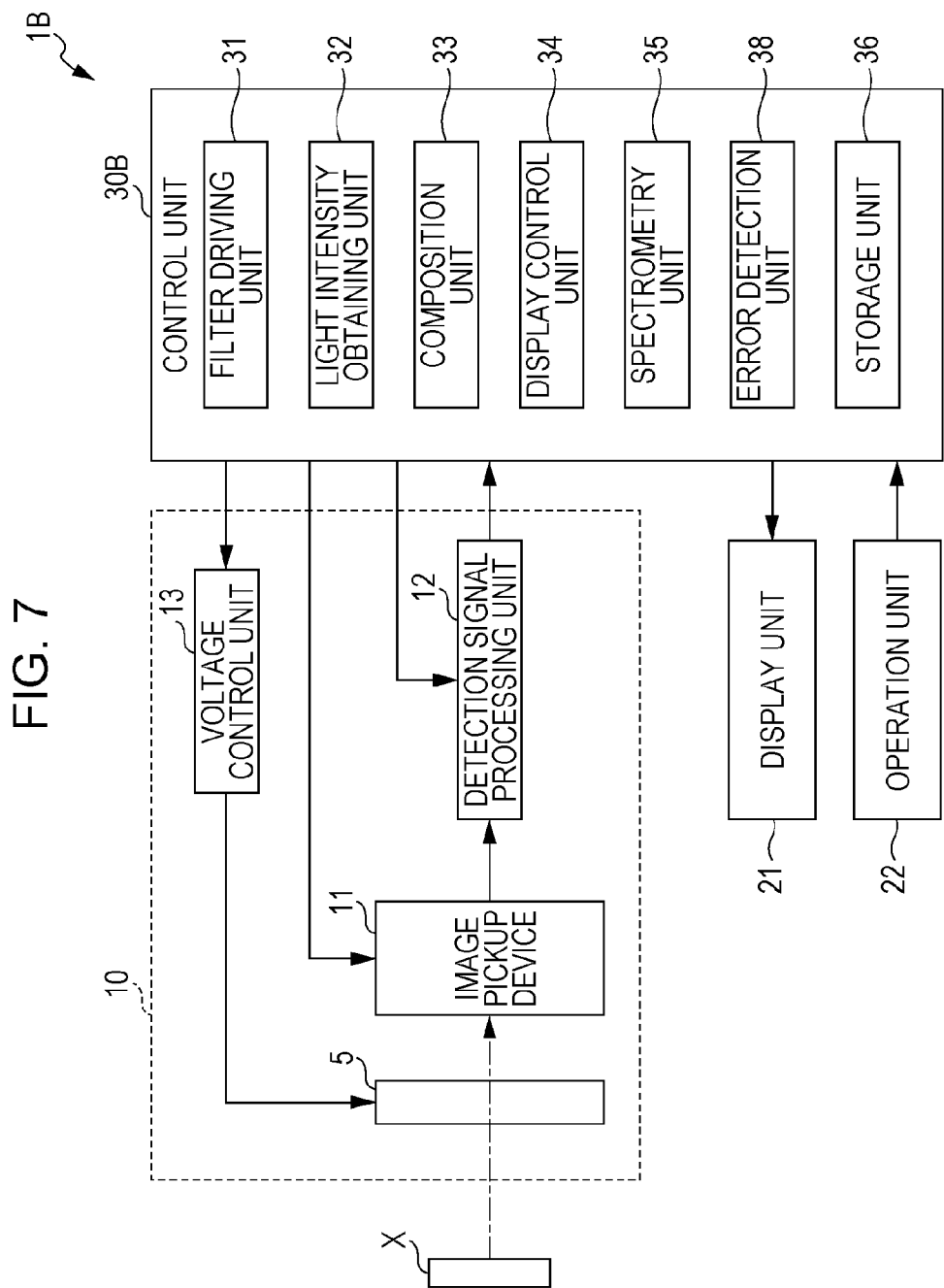
FIG. 7 is a block diagram which illustrates a schematic configuration of a spectrometry device according to a fifth embodiment of the invention.

FIG. 7 is a block diagram which illustrates a schematic configuration of a spectrometry device according to the embodiment.

As illustrated in FIG. 7, a spectrometry device 1B includes an optical module 10, a display unit 21, an operation unit 22, and a control unit 30B.

The control unit 30B includes a filter driving unit 31, a light intensity obtaining unit 32, a composition unit 33, a display control unit 34, a spectrometry unit 35, a storage unit 36, and an error detection unit 38 which corresponds to the detection unit in the invention.

The error detection unit 38 detects an error image by detecting that an imaging target has changed based on a color image with the same color among a plurality of color images which are obtained in advance, and are stored in the storage unit 36 in advance when a measurement instruction is received in step S6 which is denoted in FIG. 5.

Specifically, the error detection unit 38 detects that the imaging target has changed based on each color image corresponding to sixteen wavelengths which are obtained in advance, and stored in the storage unit 36, before performing an acquisition process of a spectral property in step S9 which is denoted in FIG. 5. In addition, the error detection unit 38 detects an error image based on a detection result in which the change of the imaging target is detected.

As a method of detecting an error in the error detection unit 38, for example, an amount of change in an image is quantitatively evaluated between the latest color image and a color image which is obtained immediately before the latest image in the wavelength range with the same color as that of the latest color image among color images which are sequentially obtained in a predetermined order, and an error determination is performed. When the changing amount exceeds an allowable range, the error detection unit 38 detects a change in imaging target by assuming that a measurement target is remarkably changed, and there is a change in the measurement target. In addition, when there is no change in detection in the imaging target, similarly, whether or not there is a change in measurement target is determined with respect to the previous color image. In addition, whether or not there is a change in the same imaging target is determined with respect to all of color images which are stored in the storage unit 36 with respect to the same wavelength range.

As a specific example of a method of determining whether or not there is a change in imaging target, for example, there is a method in which a squared error is calculated in each pixel with respect to two color images as comparison targets, a total value S of the calculated squared errors is obtained, and it is determined that a change in measurement target between respective color images exceeds the allowable range when the total value S is larger than a threshold value T. In addition, the threshold value T is set so that a composite image is obtained in which a degree of a color shift is in the allowable range according to a light receiving time of one frame, resolution of the imaging element 11, a sensitivity, or the like.

In addition, for example, a histogram is created based on a received light intensity (voltage value) of each pixel in between respective color images as comparison targets. In addition, a value of squared error $X_H$ between respective color images is obtained in each level of the histogram (range of received light intensity), and when the value of squared errors $X_H$ exceeds a threshold value $T_X$ ($X_H > T_X$), a determination that the change in the imaging target exceeds the allowable range may be made.

As described above, the error detection unit 38 detects a change in imaging target, and sets a color image of which a change is detected among color images which are stored in the storage unit 36, and all of color images which are obtained earlier than the color image as color images which are error targets. In addition, the same determination may be made with respect to all of color images of the latest fifteen wavelengths (or, sixteen wavelengths) among the color images which are stored in the storage unit 36.

In addition, the error detection unit 38 may determine presence or absence of a change in imaging target similarly with respect to the whole wavelength range, and may make the same determination with respect to one wavelength range, for example, with respect to only a wavelength range to which the lastly obtained color image belongs.

The error detection unit 38 detects presence or absence of a change in imaging target as described above, and detects an error image according to a detection result.

The detection of an error image in the error detection unit 38 is performed so that, for example, presence or absence of a change in imaging target is sequentially determined from the latest color image in an obtaining order, and a color image of which a change in imaging target is detected, and all of color images which are obtained earlier than the color image are set to error images. In addition, all of color images in which a change in imaging target is detected may be set to an error image by sequentially comparing a color image which is lastly obtained and other color images.

In addition, according to the embodiment, when an error image is detected, the spectrometry device 1B re-obtains a color image which is set to an error image, and performs a spectral property obtaining process in step S9 using a color image which is newly obtained, and the color image which is not set to the error image, and is already obtained. In addition, when the error image is obtained, all of color images of the sixteen wavelengths may be re-obtained.

Operational Effect of Fifth Embodiment

In the fifth embodiment, a change in imaging target is detected between respective color images of the same color among all of color images which are stored in the storage unit 36.

Here, when an analysis process is performed using color images of which imaging targets are different, it is not possible to perform an accurate analysis process, and an analysis accuracy deteriorates. In contrast to this, it is possible to prevent a spectrometry process using the above described wrong color image from being performed, by detecting the change in imaging target. Accordingly, it is possible to suppress deterioration in analysis accuracy.

In addition, a color image of which an imaging target is different is detected as an error image with respect to a color image which is lastly obtained after receiving a measurement instruction, that is, a color image which is obtained at a timing of the measurement instruction. In this manner, it is possible to detect as an error image a color image which is a captured image of an imaging target which is different from the imaging target at a timing in which the measurement instruction is given. Accordingly, it is possible to prevent a problem in which a color image which is a captured image of an imaging target different from a measurement target intended by a user is used in the analysis process, and due to this, analysis accuracy deteriorates.

In addition, it is possible to reliably suppress deterioration in analysis accuracy by re-obtaining at least a color image which is set to an error image.

In the embodiment, a configuration in which the error detection unit 38 which detects a change in imaging target using a plurality of spectral images corresponding to the same wavelength range is included has been exemplified; however, the invention is not limited to this. For example, it may be a configuration in which an optical sensor which detects a relative movement of an imaging target, or the like, is included, and a change in imaging target is detected.

Modification Examples of Embodiment

In addition, the invention is not limited to the above described each embodiment, and a configuration obtained using a modification, an improvement, an appropriate combination of each embodiment, or the like, in a range in which the object of the invention can be achieved is included in the invention.

For example, in each of the above described embodiments, a composite image is generated using a color image of one group every time the color image of one group is obtained; however, the invention is not limited to this. For example, in the invention, a configuration may be adopted in which a composite image is generated using the latest three color images every time a new color image is obtained, since each image in each wavelength range of R, G, and B is sequentially obtained.

In this case, it is possible to increase an updating frequency of a real time display, and to increase a frame rate of a real time image compared to a case in which a composite image is generated every time three color images of one group are obtained.

In each of the above described embodiments, a configuration in which whether or not a measurement instruction is received is determined every time color images of one group are obtained has been exemplified (refer to step S6 in FIG. 5); however, the invention is not limited to this. In the invention, for example, whether or not a measurement instruction is received may be determined every time a new color image is obtained. Even in such a configuration, in a case in which it is determined that the measurement instruction has been received, and color images of all wavelengths (fifteen wavelengths in the above described each embodiment) which are necessary for obtaining a spectral property have been obtained, the spectral property is obtained. Meanwhile, even in the case in which it is determined that the measurement instruction has been received, when color images of all wavelengths have not been obtained, a spectroscopic image corresponding to a not obtained wavelength is obtained.

In each of the above described embodiments, the spectrometry devices 1, 1A, and 1B are exemplified; however, it is possible to adopt an analysis device which performs a component analysis of a measurement target, or the like.

In addition, in each of the above described embodiments, as the spectrometry devices 1 and 1A, a configuration in which an optical spectrum is obtained based on a measurement result has been exemplified; however, the invention is not limited to this, and it is possible to apply the invention to various electronic apparatuses such as a spectral camera which obtains a spectroscopic image.

In each of the above described embodiments, there may be a configuration in which the wavelength variable interference filter 5 is incorporated in the optical module 10 in a state of being accommodated in a package. In this case, it is possible to improve driving responsiveness when a voltage is applied to the electrostatic actuator 56 of the wavelength variable interference filter 5 by performing vacuum sealing of the package in the inside thereof.

In each of the above described embodiments, the wavelength variable interference filter 5 is configured by including the electrostatic actuator 56 which causes a fluctuation in gap size between reflecting films 54 and 55 by applying a voltage; however, the invention is not limited to this.

For example, a configuration may be adopted in which an induction actuator is used in which a first induction coil is arranged instead of the fixed electrode 561, and a second induction coil or a permanent magnet is arranged instead of the movable electrode 562.

In addition, a configuration may be adopted in which a piezoelectric actuator is used instead of the electrostatic actuator 56. In this case, for example, by arranging a lower electrode layer, a piezoelectric film, and a higher electrode layer in a stacking manner in the holding unit 522, and by causing a voltage which is applied between the lower electrode layer and the higher electrode layer to vary as an input value, it is possible to bend the holding unit 522 by extending and contracting the piezoelectric film.

In each of the above described embodiments, the wavelength variable interference filter 5 in which the fixed board 51 and the movable board 52 are bonded in a state of facing each other as a Fabry-Perot etalon, the fixed reflecting film 54 is provided on the fixed board 51, and the movable reflecting film 55 is provided on the movable board 52 is exemplified; however, the invention is not limited to this.

For example, a configuration, or the like, may be adopted in which the fixed board 51 and the movable board 52 are not bonded to each other, and a gap changing unit which changes a gap between reflecting films such as a piezoelectric element is provided between the boards.

In addition, it is not limited to a configuration which is configured of two boards. For example, a wavelength variable interference filter in which two reflecting films are stacked on one board through a sacrificial layer, and a gap is formed by eliminating the sacrificial layer using etching, or the like, may be used.

In addition, as the spectral filter, for example, an Acousto Optic Tunable Filter (AOTF), or a Liquid Crystal Tunable Filter (LCTF) may be used. However, it is preferable to use the Fabry-Perot filter as in each of the above described embodiments, when considering miniaturization of the apparatus.

Other than that, a specific structure when executing the invention may be a configuration in which each of the above described embodiments and modification examples are appropriately combined in a range in which objects of the invention are achieved, and may be appropriately changed into other structures, or the like.

The entire disclosure of Japanese Patent Application No. 2014-035043 filed on Feb. 26, 2014 is expressly incorporated by reference herein.

What is claimed is:

1. An electronic apparatus comprising:
   a spectral filter which selectively outputs light with a predetermined wavelength from input light, and is capable of changing the wavelength of the output light;
   a filter driving unit which causes the spectral filter to sequentially output light with a predetermined red wavelength which is included in a red wavelength range, light with a predetermined green wavelength which is included in a green wavelength range, and light with a predetermined blue wavelength which is included in a blue wavelength range by controlling the spectral filter;
   an imaging element which receives the light output from the spectral filter, and obtains a red image corresponding to the light with the red wavelength, a green image corresponding to the light with the green wavelength, and a blue image corresponding to the light with the blue wavelength; and
   a composition unit which generates a composite image in which the red image, the green image, and the blue image are composited,
   wherein the filter driving unit causes the spectral filter to change the red wavelength in the red wavelength range every time when the red image is obtained by the imaging element, causes the spectral filter to change the green wavelength in the green wavelength range every time when the green image is obtained by the imaging element, and causes the spectral filter to change the blue wavelength in the blue wavelength range every time when the blue image is obtained by the imaging element.

2. The electronic apparatus according to claim 1,
   wherein the filter driving unit causes the spectral filter to change the red wavelength, the green wavelength, and the blue wavelength in a predetermined threshold value.

3. The electronic apparatus according to claim 1,
   wherein the filter driving unit causes the spectral filter to sequentially change a wavelength of light which is output from the spectral filter from a maximum wavelength to a minimum wavelength, after sequentially changing the wavelength of the light from the preset minimum wavelength to the preset maximum wavelength with respect to each wavelength range of the red wavelength range, the green wavelength range, and the blue wavelength range.

4. The electronic apparatus according to claim 1, further comprising:
   a correction unit in which a grayscale value of at least one of the plurality of composite images obtained by capturing images of the same imaging target is corrected, and a difference in grayscale value between the plurality of composite images is set so as to be within a range of a predetermined second threshold value.

5. The electronic apparatus according to claim 1, further comprising:
   a storage unit which stores each wavelengths which is set by the filter driving unit, and each images which is captured by the imaging element with respect to each of the wavelengths; and
   an analysis processing unit which performs spectrometry of an imaging target using the each images with respect to each wavelengths.

6. The electronic apparatus according to claim 5, further comprising:
   a detection unit which detects a change of the imaging target between the color images corresponding to the same wavelength range among each of color images of the red images, the green images, and the blue images which are stored in the storage unit.

7. A control method of an electronic apparatus which includes a spectral filter which selectively outputs light with a predetermined wavelength from input light, and is capable of changing the wavelength of the output light; a filter driving unit which causes the spectral filter to output light with a predetermined wavelength by controlling the spectral filter; an imaging element which obtains a color image by receiving color light which is output from the spectral filter; and an image generation unit which generates a composite image using the color image which is obtained using the imaging element, the method comprising:
   obtaining a red image corresponding to light with a red wavelength, a green image corresponding to light with a green wavelength, and a blue image corresponding to light with a blue wavelength using the imaging element, by sequentially outputting light with a predetermined red wavelength which is included in a red wavelength range, light with a predetermined green wavelength which is included in a green wavelength range, and light with a predetermined blue wavelength which is included in a blue wavelength range from the spectral filter;

changing the red wavelength in the red wavelength range every time when the red image is obtained;

changing the green wavelength in the green wavelength range every time when the green image is obtained;

changing the blue wavelength in the blue wavelength range every time when the blue image is obtained; and generating a composite image in which obtained the red image, the green image, and the blue image are composited.

* * * * *